United States Patent
Chesbrough

(10) Patent No.: US 6,244,778 B1
(45) Date of Patent: Jun. 12, 2001

(54) UNIVERSAL SUCTION-BASED CONNECTION DEVICE

(76) Inventor: Richard M. Chesbrough, 5213 Provincial Dr., Bloomfield Hills, MI (US) 48302

(*) Notice: Subject to any disclaimer, the term of this patent is extended or adjusted under 35 U.S.C. 154(b) by 0 days.

(21) Appl. No.: 09/235,020

(22) Filed: Jan. 21, 1999

(51) Int. Cl.$^7$ .................................................. A47F 5/00
(52) U.S. Cl. ........................... 403/51; 403/57; 248/205.6; 248/363
(58) Field of Search ........................ 403/51, 57, 229, 403/226; 248/205.6, 205.8, 206.2, 363

(56) References Cited

U.S. PATENT DOCUMENTS

| | | | |
|---|---|---|---|
| D. 327,215 | 6/1992 | Pestone | D8/373 |
| D. 341,721 | 11/1993 | Wenkman et al. | D6/300 |
| D. 342,180 | 12/1993 | Kirlin | D6/567 |
| 435,752 | 9/1890 | Ingersoll . | |
| 577,436 | 2/1897 | Lenz . | |
| 717,259 | 12/1902 | Notter . | |
| 948,113 | 2/1910 | Moore . | |
| 952,495 | 3/1910 | Austin . | |
| 963,060 | 7/1910 | Noppel . | |
| 1,147,102 | 7/1915 | Knabe . | |
| 1,183,212 | 5/1916 | Lenzikow et al. . | |
| 1,183,870 | 5/1916 | Greist et al. . | |
| 1,298,139 | 5/1919 | Wolcott . | |
| 1,496,282 | 6/1924 | Taylor . | |
| 1,632,856 | 6/1927 | Running . | |
| 1,885,103 | 11/1932 | Barnett . | |
| 2,044,520 | 6/1936 | Weiant, Jr. | 248/206 |
| 2,143,608 | 1/1939 | Morris | 20/40.5 |
| 2,146,859 | 2/1939 | Seklehner | 248/206 |
| 2,288,442 | 6/1942 | Felton | 248/229 |
| 2,311,525 | 2/1943 | Ebbs | 248/206 |
| 2,367,161 | 1/1945 | Wild | 45/28 |
| 2,516,311 | 7/1950 | Ganz | 248/206 |
| 2,601,279 | 6/1952 | Hacus | 65/61 |
| 2,642,603 | 6/1953 | Mills | 15/105 |
| 2,743,729 | 5/1956 | Butler | 131/235 |
| 2,910,264 | 10/1959 | Lindenberger | 248/362 |
| 2,936,139 | 5/1960 | Lindstrom | 248/24 |
| 2,968,888 | 1/1961 | Borah | 45/28 |
| 2,968,995 | 1/1961 | Holden | 88/97 |
| 3,071,886 | 1/1963 | Stiller | 45/28 |
| 3,101,567 | 8/1963 | Stiller | 45/28 |
| 3,310,267 | 3/1967 | Koehler | 248/176 |
| 3,407,939 | 10/1968 | Villar-Kelly | 211/90 |
| 3,445,861 | 5/1969 | Slimovitz | 2/20 |
| 3,514,065 | 5/1970 | Litt et al. | 248/363 |
| 3,623,641 | 11/1971 | Hansen et al. | 222/105 |
| 3,750,991 | * 8/1973 | Ragir | 248/206.2 X |
| 3,765,638 | 10/1973 | Harrison | 248/363 |
| 4,133,575 | * 1/1979 | Mader | 248/206.2 X |
| 4,171,584 | 10/1979 | Kaiser | 40/490 |
| 4,376,521 | 3/1983 | Walters | 248/206 R |
| 4,453,285 | * 6/1984 | Van Rosberg | 248/205.8 X |
| 4,607,875 | 8/1986 | McGirr | 296/97 D |
| 4,724,773 | 2/1988 | Newberry et al. | 108/150 |
| 4,813,640 | * 3/1989 | Perentin | 248/205.8 |

(List continued on next page.)

FOREIGN PATENT DOCUMENTS

| | | |
|---|---|---|
| 212802 | 1/1961 | (AT) . |
| 17603 | 11/1907 | (GB) . |

Primary Examiner—Lynne H. Browne
Assistant Examiner—John R. Cottingham
(74) Attorney, Agent, or Firm—Gifford, Krass, Groh, Sprinkle, Anderson & Citkowski, PC

(57) ABSTRACT

A connection device for supporting one of a plurality of accessories with respect to a support surface includes a two piece suction cup. The two piece suction cup has an outer shell and a flexible inner member attached to a plunger which extends through the shell. The plunger terminates in a connector configured to engage with a connection feature on each of the accessories. The connection device acts to support a generally universal connector with respect to a support surface.

20 Claims, 5 Drawing Sheets

U.S. PATENT DOCUMENTS

| | | | |
|---|---|---|---|
| 4,844,395 | 7/1989 | Perentin | 248/205.8 |
| 4,846,429 | 7/1989 | Scheurer et al. | 248/205.8 |
| 4,934,640 | 6/1990 | Bichon | 248/206.2 |
| 4,938,346 | 7/1990 | Urbano | 206/77.1 |
| 4,944,478 | 7/1990 | Sullivan | 248/205.7 |
| 4,951,909 | 8/1990 | Russo et al. | 248/206.2 |
| 4,979,323 | 12/1990 | Wenkman et al. | 40/152.1 |
| 4,984,693 | 1/1991 | Belokin, Jr. et al. | 211/88 |
| 4,991,807 | 2/1991 | Radnich | 248/206.3 |
| 5,011,316 | 4/1991 | Damon | 401/6 |
| 5,014,860 | 5/1991 | Emery | 211/106 |
| 5,025,919 | 6/1991 | Brinker et al. | 206/214 |
| 5,029,786 | 7/1991 | Wu | 248/205.7 |
| 5,039,046 | 8/1991 | Brewster | 248/206.3 |
| 5,047,102 | 9/1991 | Emery | 156/71 |
| 5,065,973 | 11/1991 | Wang | 248/362 |
| 5,075,991 | 12/1991 | Wenkman et al. | 40/152.1 |
| 5,080,309 | 1/1992 | Ivins | 248/205.8 |
| 5,087,005 * | 2/1992 | Holoff et al. | 248/363 X |
| 5,099,594 | 3/1992 | Reas et al. | 40/593 |
| 5,104,077 | 4/1992 | Liu | 248/205.8 |
| 5,110,078 * | 5/1992 | Gary | 248/206.2 |
| 5,133,524 | 7/1992 | Liu | 248/205.8 |
| 5,161,265 | 11/1992 | Mikiya et al. | 4/541.3 |
| 5,176,346 | 1/1993 | Liu | 248/206.1 |
| 5,176,357 | 1/1993 | Hobart | 248/683 |
| 5,217,123 | 6/1993 | Riley et al. | 211/105.1 |
| 5,232,189 | 8/1993 | Koch | 248/309.1 |
| 5,241,768 | 9/1993 | Thompson | 40/661 |
| 5,242,063 | 9/1993 | Ericksen et al. | 211/87 |
| 5,277,389 | 1/1994 | Ballares et al. | 248/206.3 |
| 5,289,927 | 3/1994 | Emery | 211/106 |
| 5,313,722 | 5/1994 | Ackerman | 40/110 |
| 5,323,996 | 6/1994 | Rendall | 248/315 |
| 5,331,693 | 7/1994 | Petersen et al. | 4/574.1 |
| 5,348,168 | 9/1994 | Emery | 211/106 |
| 5,351,841 | 10/1994 | Belokin et al. | 211/88 |
| 5,381,990 | 1/1995 | Belokin | 248/205.9 |
| 5,402,974 | 4/1995 | Adams | 248/205.5 |
| 5,405,112 | 4/1995 | Trethewey | 248/205.8 |
| 5,423,140 | 6/1995 | Nuspl | 40/518 |
| 5,423,466 | 6/1995 | Moon | 224/324 |
| 5,429,700 | 7/1995 | Hudson | 156/253 |
| 5,430,965 | 7/1995 | Lai | 40/597 |
| 5,495,884 | 3/1996 | Shikler | 160/120 |
| 5,516,019 | 5/1996 | Moon | 224/324 |
| 5,613,659 | 3/1997 | Hong | 248/205.5 |
| 5,651,520 | 7/1997 | Belokin et al. | 248/205.9 |
| 5,711,501 | 1/1998 | Belokin et al. | 248/205.9 |

* cited by examiner

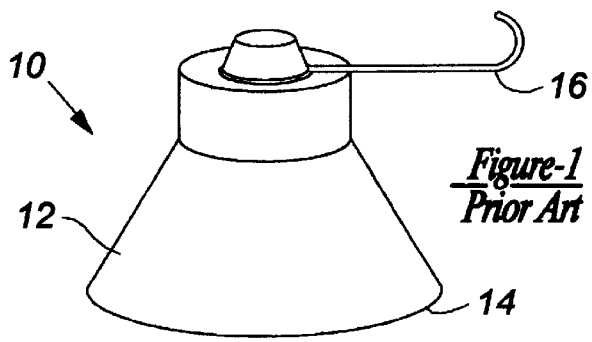
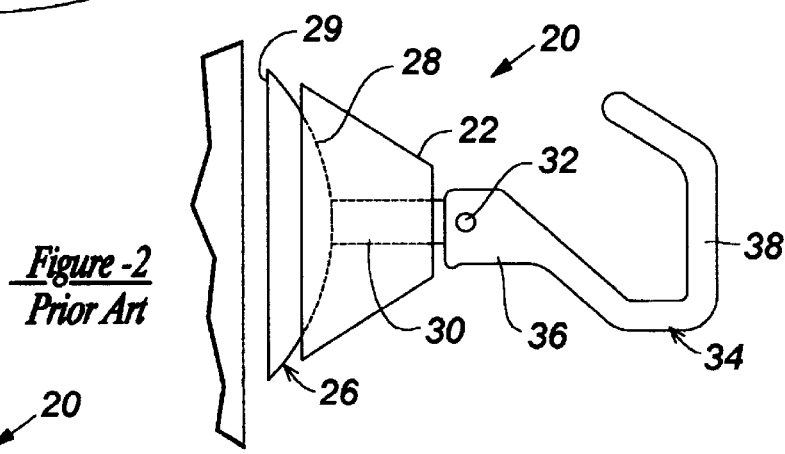
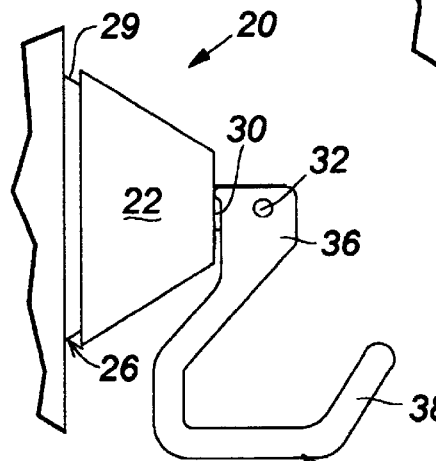
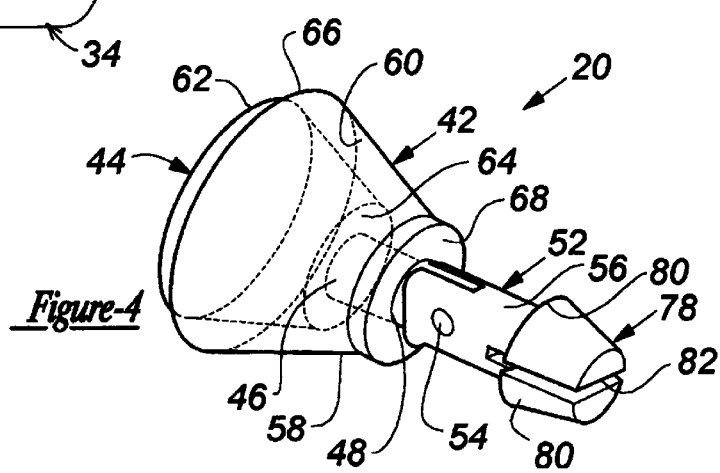

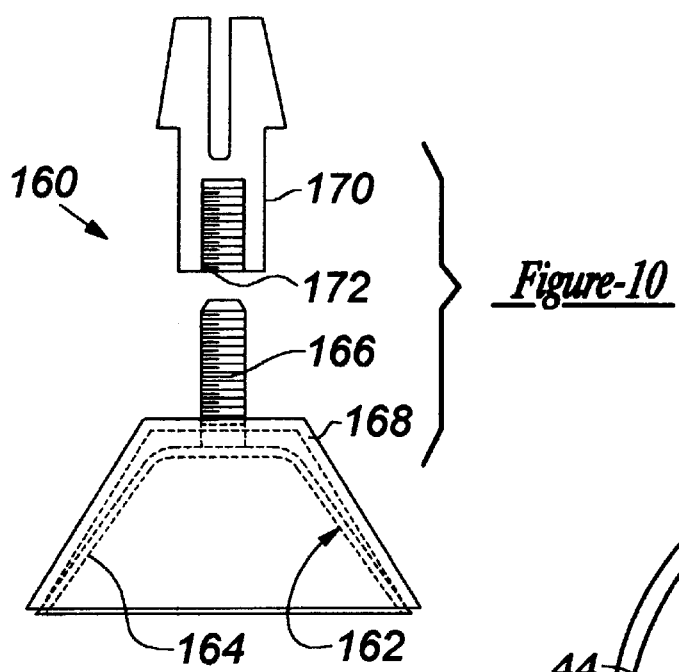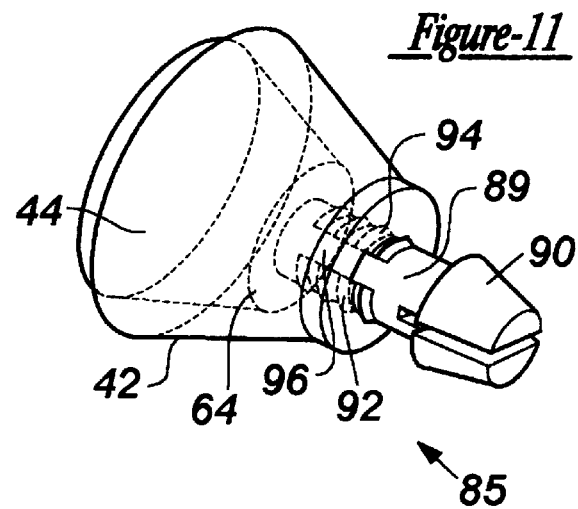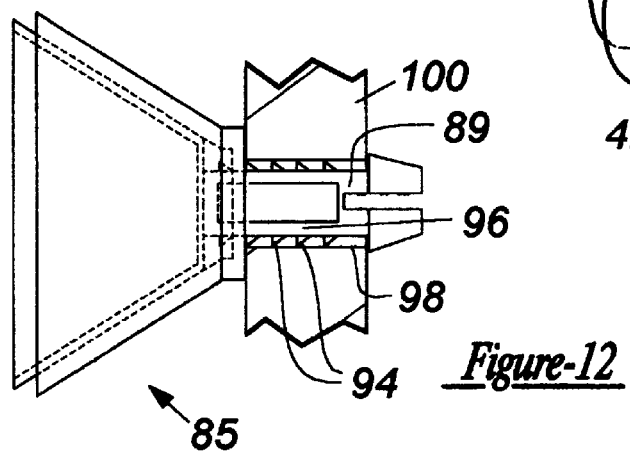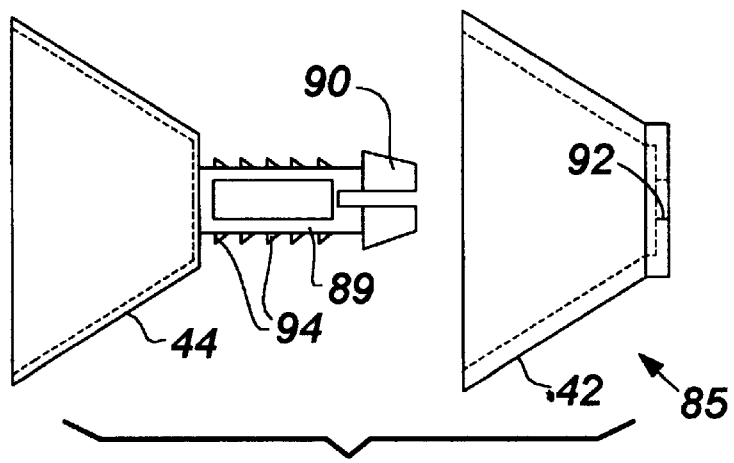

UNIVERSAL SUCTION-BASED CONNECTION DEVICE

FIELD OF THE INVENTION

The present invention relates generally to connection devices and, more specifically, to a suction based connection device that supports a generally universal connector with respect to a support surface.

BACKGROUND OF THE INVENTION

For a variety of reasons, people want or need to support objects on surfaces such as walls, windows, mirrors, and the surfaces of furniture and equipment. For some surfaces, attachment can be made using such well known connection devices as nails, screws, and other piercing type connectors. However, it is often undesirable or impossible to pierce the surface onto which connection is desired. For example, nails should not be driven into a glass surface. A magnetic connector may be used to connect to a metallic surface but does not work for non-metallic surfaces. Adhesives can also be used with some surfaces but tend to degrade the surface on which they are used.

Suction cups, such as shown in FIG. 1, are popular for attaching to smooth surfaces such as glass or metal. In its simplest form, as shown in FIG. 1, a suction cup 10 consists of a deformable concave body 12 with a perimeter lip 14. The suction cup 10 is pushed against a support surface, such as a piece of glass, so that the perimeter lip 14 contacts the support surface and the rest of the body 12 is deformed towards the support surface. When the suction cup 10 is released, the body 12 attempts to regain its concave shape and thereby forms a suction between the support surface and the underside of the body 12. Other items, such as a hook 16 can then be attached to the suction cup 10 and supported thereby. A drawback to simple suction cup devices, such as the one shown in FIG. 1, is that they often do not remain securely attached to a support surface. The suction cup 10 relies on the resilience of the deformable body 12 to create and maintain suction. Typically, such a suction cup does not create very much suction, and therefore is not very strongly attached to the support surface. In addition, the lip 14 may leak slightly causing degradation of the suction.

An improved suction cup is shown in FIGS. 2 and 3. This suction cup 20 includes a cup-shaped outer housing 22 and an inner member 26 which is fitted to the outer housing 22. The inner member 26 includes a deformable element 28 with a perimeter lip 29 for contacting a support surface. A post 30 extends upwardly from the deformable element 28 and passes through the outer housing 22 and includes a pivot point 32. The suction cup 20 also includes a hook 34 which has a pivot end 36 and a hook end 38. The pivot end 36 of the hook 34 is pivotally interconnected with pivot point 32 of the post 30.

The suction cup 20 has two positions. The first is an unlocked position, as shown in FIG. 2, wherein the hook 34 extends generally outwardly from the outer housing 22. This is a non-use position for the suction cup 20. The second position is a locked position, as shown in FIG. 3. In this position, the hook 34 is pivoted downwardly so that it lies next to the outer housing 22. As the hook 34 is pivoted downwardly, it pulls the post 30 of the inner member 26 upwardly. This in turn pulls the deformable element 28 upwardly into the outer housing 22.

In use, the suction cup 20 is placed against a support surface, such as a piece of glass, so that the deformable element 28 is in contact with the support surface, with the suction cup 20 in its unlocked position, as shown in FIG. 2. The hook 34 is then pivoted downwardly, moving the suction cup 20 to its locked position as shown in FIG. 3, thereby drawing the post 30 away from the support surface. This deforms the deformable element 28 creating a suction between deformable element 28 and the support surface.

The improved suction cup 20 engages to the support surface much more securely than the suction cup 10 shown in FIG. 1. This is for two reasons. First, the deformable element 28 is physically forced away from the support surface, thereby creating a large amount of suction. Secondly, the larger amount of suction causes the outer housing 22 to push the perimeter of the deformable element 28 securely against the support surface, thereby improving the seal between the lip 29 and the support surface. After the suction cup 20 is secured to the support surface, an item such as a hand towel or car keys may be hung from the hook 38. A major drawback to the suction cup 20 is that it is not a universal connector. Instead, it provides only a hook 38 on which items may be hung. There is a need for an easily attachable and detachable suction type device which provides a universal connector so that a variety of items may be attached to a support surface.

SUMMARY OF THE INVENTION

There is disclosed herein a connection device for supporting one of a plurality of accessories with respect to a support surface, each accessory including a connection feature. The connection device includes a two piece suction cup having an outer shell and a flexible inner member attached to a plunger which extends through the shell. The plunger terminates in a connector configured to engage with the connection feature on each of the accessories. In some embodiments, the connector is a quick connect/disconnect type connector with a barbed end. In other embodiments, the connector is a threaded shaft. In other embodiments, the connector extends perpendicular to the outer surface of the outer shell of the two piece suction cup when the two piece suction cup is in a locked position.

BRIEF DESCRIPTION OF THE DRAWINGS

FIG. 1 is a perspective view of a simple prior art suction cup;

FIG. 2 is a side elevational view of an improved prior art two piece suction cup shown in an unlocked position;

FIG. 3 is a side elevational view of the prior art suction cup of FIG. 2 shown in a locked position;

FIG. 4 is a perspective view of one embodiment of a connection device according to the present invention in a locked position;

FIG. 10 is an exploded side view of a fifth embodiment of the present invention;

FIG. 11 is a perspective view of a sixth embodiment of the present invention shown in a unlocked position;

FIG. 12 is a side elevational view of the connection device of FIG. 11 shown supporting an accessory;

FIG. 13 is a side elevational blow-up view of the connection device of FIG. 11 showing its two pieces;

DETAILED DESCRIPTION OF THE PREFERRED EMBODIMENTS

Figure 5:
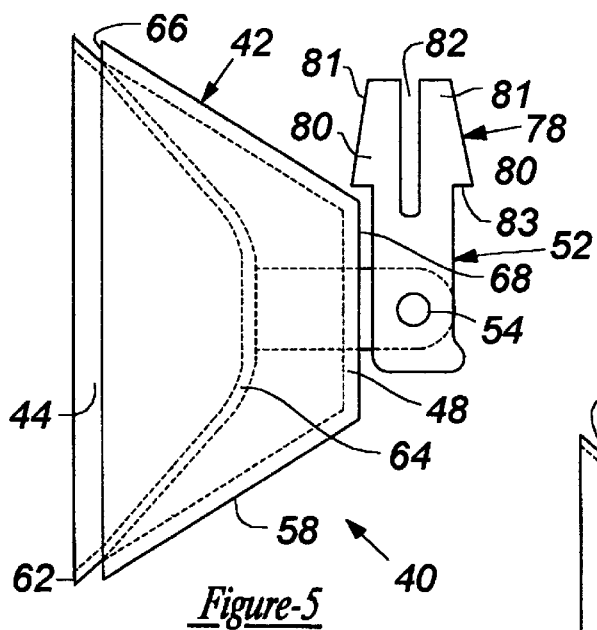
FIG. 5 is a side elevational view of the connection device of FIG. 4 shown in an unlocked position.
Figure 6:
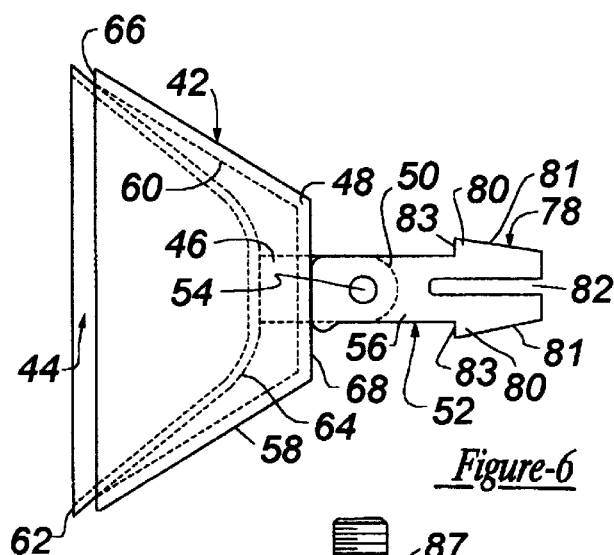
FIG. 6 is a side elevational view of the connection device of FIG. 4 shown in a locked position.

Referring to FIGS. 4–6, a first embodiment of a connection device according to the present invention is shown generally at 40. The connection device includes an outer shell 42 with a flexible inner member or cup 44 fitted thereto. The outer shell 42 is generally cup shaped with a concave inner surface 60 and an outer surface 58, the surfaces 58 and 60 being joined at a perimeter 66. The flexible inner member or cup 44 has a perimeter lip 62 and a central portion 64. A plunger 46 is connected to the central portion 64 of the inner member or cup 44. The plunger 46 extends through an aperture 48 in the outer shell 42 and terminates in an exposed end 50. The aperture 48 is spaced from the perimeter 66 of the outer shell 42. The portion of the outer surface 58 of the outer shell 42 through which the aperture 48 passes, defines a generally flat camming surface 68.

In the illustrated embodiment, the perimeter lip 62 and the perimeter 66 of the outer shell 42 are both circular. However, as will be clear to one of skill in the art, both the outer shell 42 and the inner member or cup 44 could be shaped as an oval, a square, a rectangle, or any other desirable shape. It is preferred that the perimeters 62 and 66 each have the same corresponding shape in any given embodiment.

The outer shell 42 is preferably formed of a semi-rigid material such as plastic or metal. The flexible inner member or cup 44 is preferably formed from a resilient material such as silicon, plastic, or rubber. Most preferably, the flexible inner member cup 44 has a soft compliant surface so that it forms an air-tight seal with a support surface.

A connector 52 is connected to the exposed end 50 of the plunger 46. In this embodiment, the exposed end 50 of the plunger 46 includes a pivot pin 54 defining a pivot axis. The connector 52 is pivotally interconnected with the exposed end 50 of the plunger 46 via this pivot pin 54. The connector 52 performs as a lever arm 56 which can be pivoted from an unlocked position as shown in FIG. 5 to a locked position as shown in FIGS. 4 and 6. In the unlocked position, as shown in FIG. 5, the lever arm 56 overlies the outer surface 58 of the outer shell 42. In the locked position, as shown in FIGS. 4 and 6, the lever arm 56 extends perpendicularly from the outer surface 58 of the outer shell 42.

Figure 4A:
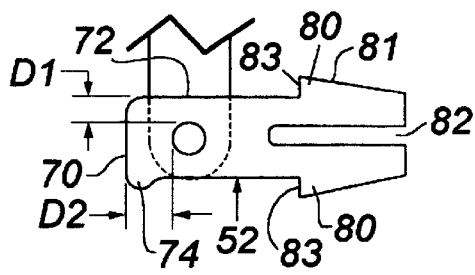
FIG. 4a is a detail view of the connector portion of the connection device of FIG. 4.

Referring now to FIG. 4a, the connector 52 has a bottom surface 70 and a side surface 72. The side surface 72 is spaced from the pivot pin 54 at a first distance D1 and the bottom surface 70 is spaced from the pivot pin by a second distance D2. As shown, the distance D2 is greater than the distance D1. When the connection device 40 is in the unlocked position, as shown in FIG. 5, with the lever arm 56 overlying the outer surface 58, the side surface 72 of the connector 52 is positioned between the pivot pin 54 and the camming surface 68. This allows the pivot pin 54 and the plunger 46 to move downwardly thereby relaxing the inner member or cup 44. When the connection device 40 is in the locked position, as shown in FIGS. 4 and 6, with the lever arm 56 of the connector 52 extending perpendicularly outwardly from the outer surface 58 of the outer shell 42, the bottom surface 70 of the connector 52 is positioned between the pivot pin 54 and the canning surface 68. This arrangement allows the pivot pin 54 to be positioned closer to the camming surface 68 when the connection device 40 is in the unlocked position (FIG. 5) and to be forced to a distance farther from the camming surface 68 when the connection device 40 is in the locked position (FIG. 6). Therefore, the plunger 46 pulls the flexible inner member or cup 44 into the outer shell 42 as the lever arm 56 of the connector 52 is pivoted from the unlocked position to the locked position. As best shown in FIG. 4a, the bottom surface 70 of the connector 52 is preferably shaped so as to allow the lever arm 56 to be pivoted to one side but not to the other. One side of the bottom surface 70 has a tab 74 extending sideways therefrom to prevent the connector 52 from pivoting in that direction. This tab 74 also helps to stabilize the connector 52 and may extend further than shown. The bottom surface 70 may also include a small nub at its other side, extending to the side and/or downwardly. This nub gives the connector 52 a slight over-center affect as its pivoted from the unlocked to the locked position.

In operation, the connection device 40, in its unlocked position, is placed against a support surface so that the perimeter lip 62 of the flexible inner member or cup 44 is against the support surface. The connector 52, which comprises a lever arm 56, is pivoted from the position overlying the outer surface 58 to the position extending perpendicularly from the outer surface 58 thereby forcing the pivot pin 54 to a position further from the camming surface 68 and drawing the flexible inner member or cup 44 into the outer shell 42. By drawing the central portion 64 of the flexible inner member or cup 44 away from the support surface, the area between the inner member or cup 44 and the support surface is increased, thereby creating a suction. The suction attempts to pull the inner member or cup 44 towards the support surface thereby pulling down on the outer shell 42. Preferably, the perimeter 66 of the outer shell 42 overlies the perimeter lip 62 of the inner member or cup 44 and thereby increases the clamping force of the perimeter lip 62 against the support surface. As will be clear to one of skill in the art, the size, shape and relative positions of the various components of the connection device 40 may be altered to increase or decrease the amount of suction developed.

Figure 6A:
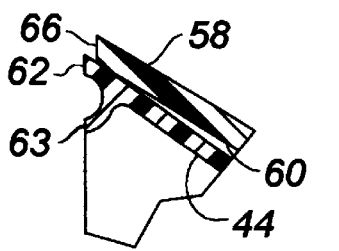
FIG. 6a is a cross-sectional detailed view of a portion of a double lip feature included on some embodiments of the present invention.
Figure 14:
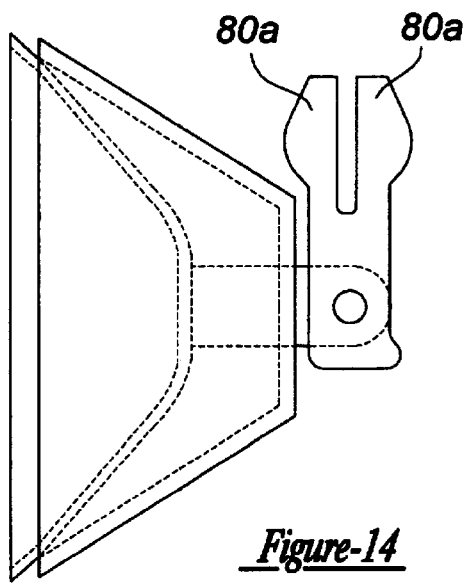
FIG. 14 is a side elevational view of a seventh embodiment of the present invention.
Figure 15:
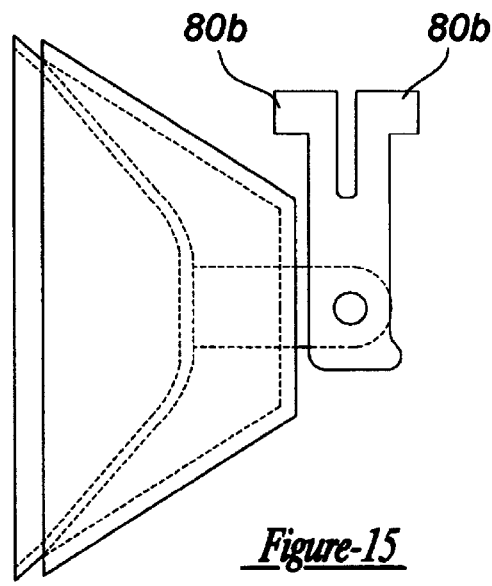
FIG. 15 is a side elevational view of an eighth embodiment of the present invention.
Figure 16:
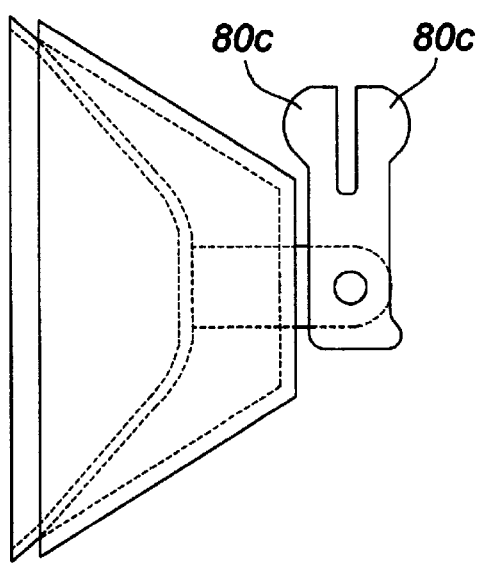
FIG. 16 is a side elevational view of a ninth embodiment of the present invention.
Figure 17:
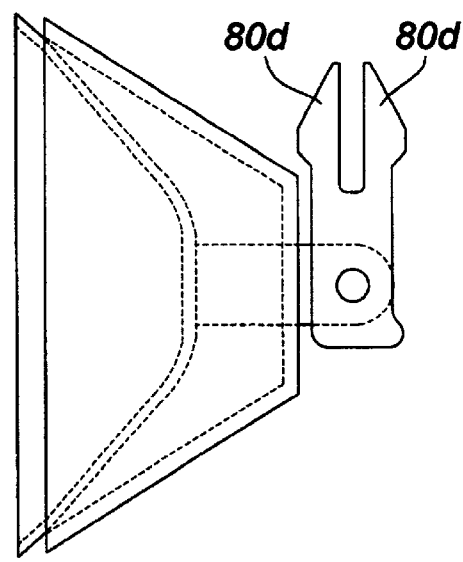
FIG. 17 is a side elevational view of a tenth embodiment of the present invention.

Referring now to FIG. 6a, some embodiments of the present invention include a double lip at the perimeter of the flexible inner member or cup 44. As discussed earlier, the flexible inner member or cup 44 has a perimeter lip 62 which is designed to contact and seal with a support surface when the connection device is being used. In addition, some embodiments include a supplemental lip 63 which is spaced from the perimeter lip 62. In the illustrated embodiments of the present invention, in which the perimeter lip 62 is circular, the perimeter lip 62 and the supplemental lip 63 are formed as concentric rings spaced a short distance apart. The supplemental lip 63 acts to increase the seal between the inner member 44 and a support surface. In some applications, such as where the connection device is used in a shower or bathing area, the perimeter lip 62 will be exposed to water and soap each time the area is used. This exposure may eventually degrade the seal between the perimeter lip 62 and the support surface. The supplemental lip 63 adds an additional level of sealing. Also, the perimeter lip 62 can act as a shield for the supplemental lip 63 by helping to prevent degradation of the seal between the supplemental lip 63 and the support surface. As will be clear to one of skill in the art, the present invention may be constructed with just a perimeter lip 62, or with one or more supplemental lips 63.

Referring back to FIGS. 4–6, the lever arm 56 of the connector 52 has a bottom surface 70 at one of its ends and a barbed end 78 at its other. The barbed end 78 is designed to engage a hole in an accessory to be supported by the connection device 40. In the embodiment shown, the lever arm 56 is shaped as a round shaft. The barbed end 78 has a pair of tabs 80 extending radially outwardly from the lever arm 56. The tabs 80 have a gradual slope 81 facing away from the pivot pin 54 and a blunt slope 83 facing toward the pivot pin 54. The gradual slope 81 allows for easy insertion of the barbed end 78 into a hole with the blunt slope 83 acting to retain the connector 52 in the hole. A longitudinal slit 82 between the tabs 80 allows them to flex towards one another. The barbed end 78 is pushed into a hole in an accessory so that the tabs 80 come out the other side of the hole thereby locking into the hole in the accessory.

Figure 7:
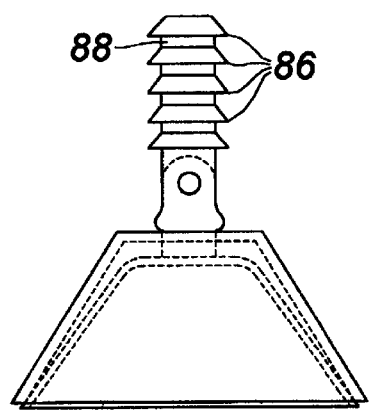
FIG. 7 is a side elevational view of a second embodiment of the present invention shown in a locked position.

The lever arm 56 is sized to fit within the hole in the accessory to be supported. The barbed end 78 of the connector 52 cooperates with the lever arm 56 to act as a quick connect/disconnect type connector. By this, it is meant that an accessory having a round hole may be quickly and easily connected and disconnected from the connector 52. The tabs 80 act to securely retain the accessory and may be released by squeezing the tabs 80 towards one another and releasing the accessory. Alternatively, the blunt slopes 83 may be shaped so as to allow the accessory to be pulled off of the tabs 80 without squeezing them. As will be clear to one of skill in the art, other types of quick connect/disconnect type connectors exist. Referring to FIGS. 7 and 14–17, additional types of quick connect/disconnect connectors are shown in alternative embodiments of the present invention. In FIG. 7, the quick connect/disconnect type of connector has a plurality of circumferential flexible tabs 86 extending from a round shaft 88. This type of connector is often known as a Christmas tree-type connector. Depending on its exact configuration, an accessory may be easily connected to a Christmas tree-type connector merely by pushing a hole in the accessory over the shaft 88 and tabs 86 of the connector.

Referring to FIGS. 14–17 alternative embodiments of the present invention are shown to illustrate variations on the shape of tabs which form a quick connect/disconnect type connector. In these embodiments, various types of tabs are labeled as 80a–80d. As will be clear to one of skill in the art, different shapes of tabs 80a–80d may be chosen depending on the application of the connection device and the type of accessory to be connected.

As will be clear to one of skill in the art, many types of quick connect/disconnect connectors are available. However, quick connect/disconnect type connectors, as defined herein, do not include a threaded shaft which does not qualify as a "quick" connector. The connectors discussed thus far qualify as quick connect/disconnect type connectors and have round shafts. However, as will be clear to one of skill in the art, the connectors could have square, oval or rectangular cross-sectional shafts or some other shape as necessary to interconnect with an accessory. The connectors illustrated also qualify as universal connectors as they will connect to and support a very wide variety of accessories as long as those accessories have a hole therein of the proper size. The connectors do not require a specific type of interconnection feature as required by some type of specialty connectors.

Figure 8:
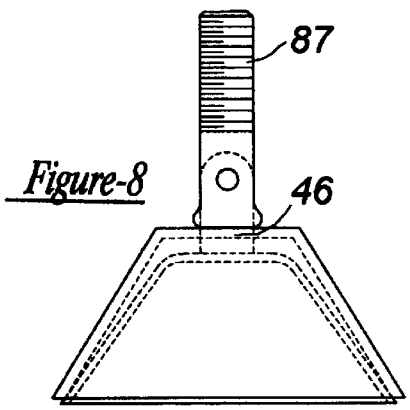
FIG. 8 is a side elevational view of a third embodiment of the present invention shown in a locked position.

Referring now to FIG. 8, a third embodiment of the present invention is shown. This embodiment is similar to the connection devices of FIGS. 4–7 but has a different type of connector 87. In this embodiment the connector 87 comprises a threaded shaft which is pivotally interconnected with the plunger 46. While the threaded shaft 87 does not qualify as a quick connect/disconnect type connector, as defined herein, it does qualify as a universal type connector as it will interconnect with and support any of a variety of accessories having a hole of the proper diameter. A nut, not shown, is then threaded onto the threaded shaft 87 to support the accessory. As in the previous embodiments, the threaded shaft 87 extends perpendicularly from the outer surface of the outer shell. This embodiment allows the user to position a threaded shaft, for connection to a variety of accessories, on any generally flat non-porous surface, such as a window or mirror.

Figure 9:
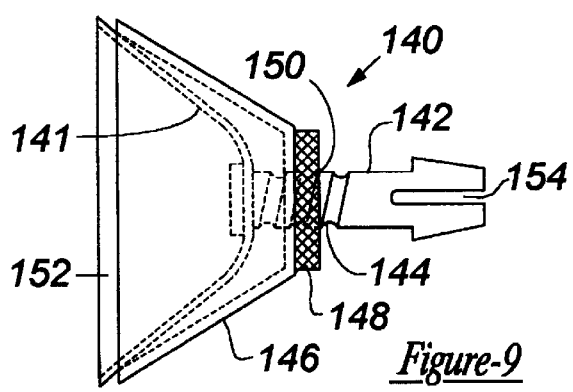
FIG. 9 is a side elevational view of a fourth embodiment of the present invention.

Referring now to FIG. 9, a fourth embodiment of the present invention is generally shown at 140. This embodiment differs from the earlier embodiments in that the plunger 142 includes a spiral cut groove 144. In this embodiment, the outer housing 146 includes an upper portion 148 with a threaded aperture 150 designed to engage the spiral cut groove 144 in the plunger 142. Therefore, the inner member 141, which includes the plunger 142, threadingly engages the outer housing 146. By turning the inner member 141 and outer housing 146 relative to one another, the deformable element 152 portion of the inner member 141 is drawn into the outer housing 146, thereby creating a suction between the deformable element 152 and a support surface. As will be clear to one of skill in the art, the embodiment of FIG. 9 may be implemented in a number of ways. For example, the upper portion 148 of the outer housing 146 may be rotatable with respect to the remainder of the outer housing 146. In this case, the upper portion 148 is gripped and turned in order to pull the inner member 141 upwardly away from a support surface. Alternatively, the upper portion 148 may be integral with the remainder of the outer housing 146 so that the entire outer housing 146 is turned in order to draw the inner member 141 upwardly. As yet another alternative, the plunger 142 may be rotatable with respect to the remainder of the inner member 141 so that the plunger 142 may be twisted, thereby drawing the remainder of the inner member 141 upwardly away from the support surface. In this case, the slot 154 in the end of the plunger 142 could be engaged with a tool to assist in twisting the plunger 142.

Referring now to FIG. 10, a fifth embodiment of the present invention is shown. In this embodiment, the connection device 160 includes an inner member 162 which includes a deformable element 164 and a threaded plunger 166 which extends through an outer housing 168. In this embodiment, a connector 170, with a threaded inner bore 172 is threaded onto the threaded plunger 166 to draw the deformable element 162 into the outer housing 168, thereby forming suction. As shown, the connector 170 is a quick connect/disconnect type connector, as discussed earlier.

Referring now to FIGS. 11–13, a sixth embodiment of the present invention is shown. In this embodiment, the plunger 89 and connector 90 are formed as a unitary piece which extends perpendicularly from the central portion 64 of the flexible inner member or cup 44 through an aperture 92 in the outer shell 42. The plunger 89 has a plurality of teeth 94 extending outwardly from a round shaft 96. The teeth 94 engage the aperture 92. In operation, the connection device 85 is placed against the support surface and then the connector 90 and plunger 89 are pulled up through the aperture 92 as far as possible. This draws the inner member 44 into the outer shell 42 thereby creating a suction and locking the connection device 85 against the support surface. The teeth 94 engage the aperture 92 thereby preventing the plunger 89 from being drawn back through the aperture 92. In this way, the suction is held. As shown in FIG. 10, once the connection device 85 is locked against the support surface, the connector 90 can be used to engage a hole 98 in an accessory 100.

As mentioned previously, the present invention is designed to support an accessory on a support surface. As used herein, accessory refers to items such as picture frames, mirrors, shower caddies, pegboards and other items which consumers would like to support on surfaces such as windows, mirrors, walls, and furniture. Typically, accessories include holes for mounting them to walls using nails or screws. The present invention provides a substitute for nails and screws by allowing the non-permanent attachment of an accessory to a support surface.

Figure 18:
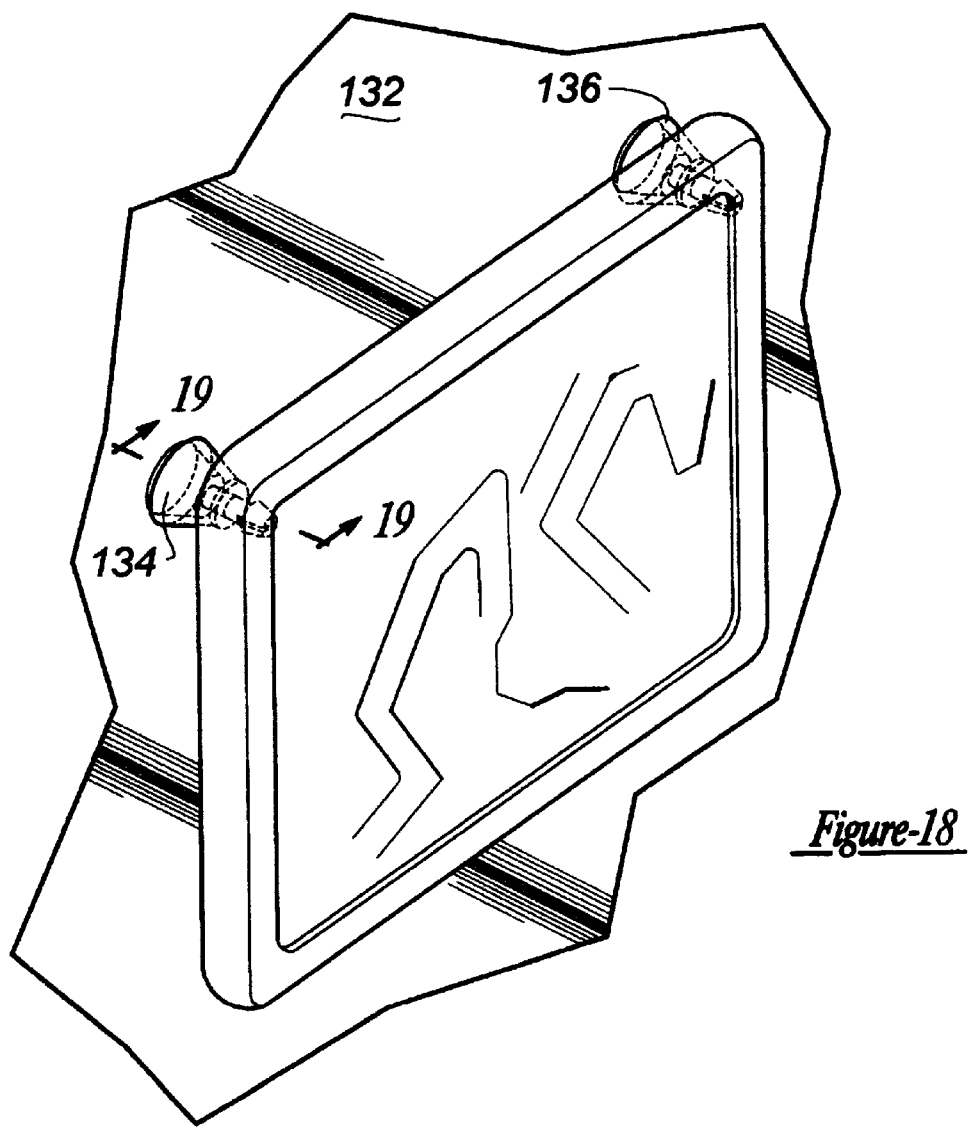
FIG. 18 is a perspective view of two connection devices according to the present invention supporting an accessory on a support surface.
Figure 19:
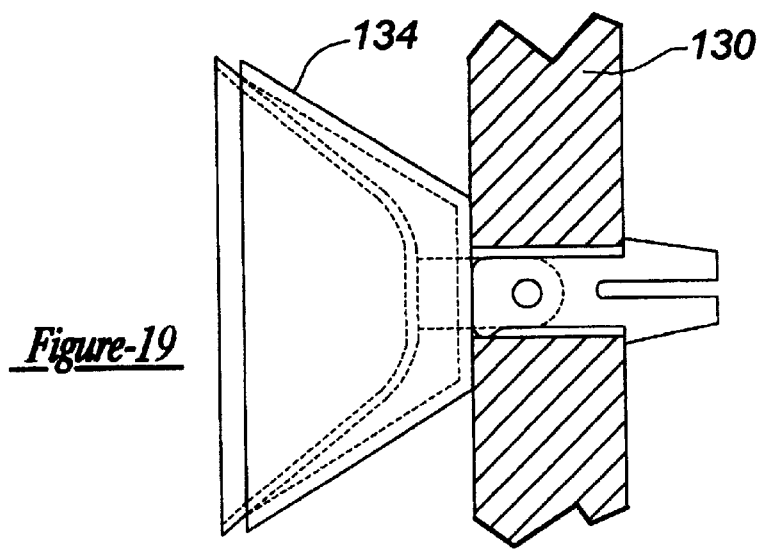
FIG. 19 is a cross-sectional view of a connection device according to the present invention taken along lines 19—19 in FIG. 18.

Referring now to FIGS. 18 and 19, a generic accessory 130 is shown supported on a support surface 132 by a pair of connection devices 134 and 136.

In view of the teaching presented herein, other modifications and variations of the present inventions will be readily apparent to those of skill in the art. The foregoing drawings, discussion, and description are illustrated of some embodiments of the present invention, but are not meant to be limitations of the practice thereof. This is the following claims, including all equivalents which define the scope of the invention.

I claim:

1. In a connection device having an outer shell with a central region and a flexible inner cup attached to a plunger which extends through the central region of the outer shell and terminates in an exposed end, the device having an unlocked position and a locked position wherein the inner cup is drawn into the outer shell by the plunger when the device is in the locked position, the outer shell having an outer surface, the device comprising:
   a quick connect/disconnect type connector having a barbed end connected to the exposed end of the plunger, the barbed end extending perpendicularly from the central region of the outer surface of the outer shell when the device is in the locked position, the barbed end including at least one tab extending radially outwardly from said connector.

2. The connection device according to claim 1, wherein the connector comprises a lever arm which is pivotally interconnected with the plunger, the lever arm overlying the outer surface of the outer shell when the connection device is in the unlocked position and the lever arm extending perpendicularly from the outer surface of the outer shell when the connection device is in the locked position.

3. The connection device according to claim 2, wherein the lever arm has a side surface which is positioned between the pivotal interconnection and outer surface of the outer shell when the connection device is in the unlocked position, the side surface being spaced from the pivotal interconnection by a distance D1, the lever arm further having a bottom surface for contacting the outer surface of the outer shell when the connection device is in the locked position, the bottom surface being spaced from the pivotal interconnection by a distance D2 which is greater than D1.

4. The connection device according to claim 3, wherein the bottom surface of the lever arm has a tab extending perpendicularly therefrom for stabilizing the lever arm when the connection device is in the locked position.

5. The connection device according to claim 1, wherein the connector comprises a Christmas tree type connector having a shaft and a plurality of tabs extending radially outwardly from said shaft.

6. The connection device according to claim 1, wherein the connector comprises a round shaft and the at least one tab comprises a pair of tabs extending radially outwardly from the round shaft, each of the tabs having a gradual slope facing away from the outer shell and a steep slope facing toward the outer shell.

7. The connection device according to claim 6, wherein the connector further includes a longitudinal slit between the pair of tabs to allow the tabs to flex toward each other.

8. The connection device according to claim 1, wherein the inner cup comprises a perimeter lip for contacting and sealing to a support surface, the inner cup further comprising a supplemental lip which is spaced from the perimeter lip.

9. A connection device for supporting one of a plurality of accessories with respect to a support surface, each accessory including a connection feature, the connection device comprising:
   a two piece suction cup having an outer shell with a central region and a flexible inner member attached to a plunger extending through the central region of the outer shell, the connection device having an unlocked position and a locked position wherein the inner member is drawn into the outer shell by the plunger when the device is in the locked position, the outer shell having an outer surface, the plunger terminating in an exposed end; and
   a connector configured to engage with the connection feature on each of the accessories, the connector comprising a lever arm having a central axis, an inner end which is pivotally interconnected with the exposed end of the plunger, and an outer end comprising a connection means, the connection means being substantially symmetrical about the central axis of the lever arm, the lever arm overlying the outer surface of the outer shell when the connection device is in the unlocked position and the connection means extending perpendicularly outwardly from the central region of the outer surface of the outer shell when the connection device is in the locked position, the lever arm having a side surface which is positioned between the pivotal interconnection and outer surface of the outer shell when the connection device is in the unlocked position, the side surface being spaced from the pivotal interconnection by a distance D1, the lever arm further having a bottom surface for contacting the outer surface of the outer shell when the connection device is in the locked position, the bottom surface being spaced from the pivotal interconnection by a distance D2 which is greater than D1.

10. The connection device according to claim 9, wherein the connection means comprises a quick connect/disconnect type connector having a barbed end.

11. A connection device for supporting one of a plurality of accessories with respect to a support surface, each accessory including a connection feature, the connection device comprising:

a two piece suction cup having an outer shell with a central region and a flexible inner member attached to a plunger extending through the central region of the outer shell, the connection device having an unlocked position and a locked position wherein the inner member is drawn into the outer shell by the plunger when the device is in the locked position, the outer shell having an outer surface, the plunger terminating in an exposed end; and a connector configured to engage with the connection feature on each of the accessories, the connector comprising a lever arm having an inner end which is pivotally interconnected with the exposed end of the plunger and an outer end comprising a connection means, the connection means comprising a threaded shaft, the lever arm overlying the outer surface of the outer shell when the connection device is in the unlocked position and the connection means extending perpendicularly outwardly from the central region of the outer surface of the outer shell when the connection device is in the locked position, the lever arm having a side surface which is positioned between the pivotal interconnection and outer surface of the outer shell when the connection device is in the unlocked position, the side surface being spaced from the pivotal interconnection by a distance D1, the lever arm further having a bottom surface for contacting the outer surface of the outer shell when the connection device is in the locked position, the bottom surface being spaced from the pivotal interconnection by a distance D2 which is greater than D1.

12. A connection device for supporting one of a plurality of accessories with respect to a support surface, each accessory including a connection feature, the connection device comprising:

a two piece suction cup having an outer shell with a central region and a flexible inner member attached to a plunger extending through the central region of the outer shell, the connection device having an unlocked position and a locked position wherein the inner member is drawn into the outer shell by the plunger when the device is in the locked position, the outer shell having an outer surface, the plunger terminating in an exposed end; and a connector configured to engage with the connection feature on each of the accessories, the connector comprising a lever arm having an inner end which is pivotally interconnected with the exposed end of the plunger and an outer end comprising a connection means, the connection means comprising a Christmas tree type connector having a shaft and a plurality of tabs extending radially outwardly from said shaft, the lever arm overlying the outer surface of the outer shell when the connection device is in the unlocked position and the connection means extending perpendicularly outwardly from the central region of the outer surface of the outer shell when the connection device is in the locked position, the lever arm having a side surface which is positioned between the pivotal interconnection and outer surface of the outer shell when the connection device is in the unlocked position, the side surface being spaced from the pivotal interconnection by a distance D1, the lever arm further having a bottom surface for contacting the outer surface of the outer shell when the connection device is in the locked position, the bottom surface being spaced from the pivotal interconnection by a distance D2 which is greater than D1.

13. A connection device for supporting one of a plurality of accessories with respect to a support surface, each accessory including a connection feature, the connection device comprising:

a two piece suction cup having an outer shell with a central region and a flexible inner member attached to a plunger extending through the central region of the outer shell, the connection device having an unlocked position and a locked position wherein the inner member is drawn into the outer shell by the plunger when the device is in the locked position, the outer shell having an outer surface, the plunger terminating in an exposed end; and a connector configured to engage with the connection feature on each of the accessories, the connector comprising a lever arm having an inner end which is pivotally interconnected with the exposed end of the plunger and an outer end comprising a connection means, the connection means comprising a round shaft with a pair of tabs extending radially outwardly from the round shaft, each of the tabs having a gradual slope facing away from the outer shell and a steep slope facing toward the outer shell, the lever arm overlying the outer surface of the outer shell when the connection device is in the unlocked position and the connection means extending perpendicularly outwardly from the central region of the outer surface of the outer shell when the connection device is in the locked position, the lever arm having a side surface which is positioned between the pivotal interconnection and outer surface of the outer shell when the connection device is in the unlocked position, the side surface being spaced from the pivotal interconnection by a distance D1, the lever arm further having a bottom surface for contacting the outer surface of the outer shell when the connection device is in the locked position, the bottom surface being spaced from the pivotal interconnection by a distance D2 which is greater than D1.

14. The connection device according to claim 13, wherein the connection means further includes a longitudinal slit between the tabs to allow the tabs to flex toward each other.

15. The connection device according to claim 9, wherein the inner cup comprises a perimeter lip for contacting and sealing to a support surface, the inner cup further comprising a supplemental lip which is spaced from the perimeter lip.

16. A connection device comprising:

a two-piece suction cup having an outer shell with a central region and a flexible inner member attached to a plunger extending through the central region of the outer shell;

the connection device having an unlocked position and a locked position wherein the inner member is drawn into the outer shell by the plunger when the device is in the locked position;

the outer shell having an outer surface, the plunger terminating in an exposed end; and a connector comprising a lever arm having an inner end which is pivotally interconnected with the exposed end of the plunger and a threaded shaft extending from said inner end, the threaded shaft overlying the outer surface of the outer shell when the connection device is in the unlocked position and the threaded shaft extending perpendicularly outwardly from the central region of the outer surface of the outer shell when the connection device is in the locked position.

17. The connection device according to claim 9, wherein the connection means comprises a Christmas tree type connector having a shaft and a plurality of tabs extending radially outwardly from said shaft.

18. The connection device according to claim 9, wherein the connection means comprises a round shaft with a pair of tabs extending radially outwardly from the round shaft, each of the tabs having a gradual slope facing away from the outer shell and a steep slope facing toward the outer shell.

19. The connection device according to claim 18, wherein the connection means further includes a longitudinal slit between the tabs to allow the tabs to flex toward each other.

20. The connection device according to claim 9, wherein the inner member comprises a perimeter lip for contacting and sealing to a support surface, the inner member further comprising a supplemental lip which is spaced from the perimeter lip.

* * * * *